United States Patent Office.

THOMAS BELL, OF NEW YORK, N. Y.

IMPROVED MEDICINE FOR THE CURE OF CONSUMPTION, &c.

Specification forming part of Letters Patent No. 54,097, dated April 24, 1866.

*To all whom it may concern:*

Be it known that I, THOMAS BELL, of the city of New York, in the county and State of New York, have invented a certain new and useful Medicine for the Cure of Consumption and Analogous Diseases; and I do hereby declare that the following is a full and exact description thereof.

My invention consists in a sirup adapted to endure for a considerable period without change, and in which the root known as "marshmallow," a plant of the genus *Althæa,* (*Althæa officinalis,*) is one of the chief ingredients. I have discovered that this vegetable may be so prepared, and is of peculiar efficacy in all diseases of the lungs and connected organs.

To enable others skilled in the art to make and use my invention, I will proceed to describe what I consider the best mode of carrying out my invention.

I immerse the marshmallow-roots, either whole or cut or torn, in a sufficient quantity of water to allow about one pint for each root. I boil the roots in this water very slowly for about eight hours. To the decoction thus produced I add honey and sugar in about equal quantities, so as to give a quite sweet taste to the sirup. I then add Bourbon or other whisky in the proportion of about one pint to each gallon. I add other ingredients which it is not necessary to describe, because they form no part of this my present invention.

A larger or smaller quantity of spirit may be added, according to the length of time for which it is to be preserved and the temperature which it is to endure. I believe one-tenth whisky, or about the proportion above indicated, will serve well under ordinary circumstances in this climate.

Having now fully described my invention, what I claim as new therein, and desire to secure by Letters Patent, is—

The sirup composed of *Althæa officinalis,* alcoholic spirit, and sugar in the proportions and so as to form a permanent compound having the properties herein set forth.

THOMAS BELL.

Witnesses:
 THOMAS D. STETSON,
 D. W. STETSON.